(No Model.)
J. DONOVAN.
ROAD CART.
No. 461,158.  Patented Oct. 13, 1891.
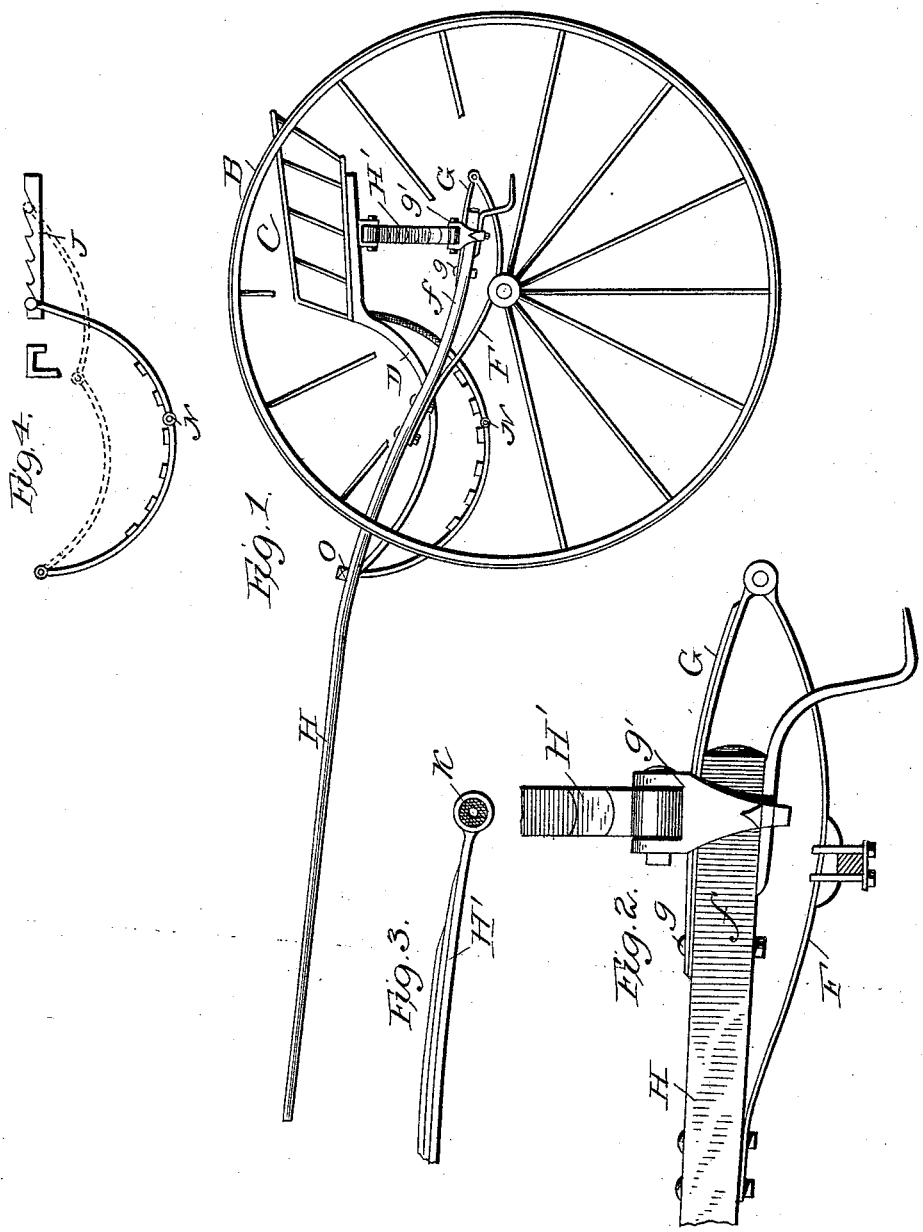
Attest:
James M. ...
W. P. Keene.
Inventor
James Donovan
by Walter Donaldson
Attys.
THE NORRIS PETERS CO., PHOTO-LITHO., WASHINGTON, D. C.

UNITED STATES PATENT OFFICE.

JAMES DONOVAN, OF GOSHEN, NEW YORK.

ROAD-CART.

SPECIFICATION forming part of Letters Patent No. 461,158, dated October 13, 1891.

Application filed February 12, 1891. Serial No. 381,151. (No model.)

*To all whom it may concern:*

Be it known that I, JAMES DONOVAN, a citizen of the United States of America, residing at Goshen, in the county of Orange and State of New York, have invented certain new and useful Improvements in Road-Carts, of which the following is a specification.

My invention relates, particularly, to road-carts, though it is not strictly confined to this class of vehicles.

My object is to produce a cart which shall be simple and durable in construction, adapted to ordinary or speeding purposes, and which shall be easy and noiseless in running.

My object is to provide an adjustable foot-rest adapted to persons of different heights, or which may be adjusted out of the way entirely when the cart is to be used for speeding purposes.

In the drawings, Figure 1 is a side elevation partly broken away. Fig. 2 is an enlarged view of the springs. Fig. 3 illustrates the rubber bushings for the ends of the cross-springs, and Fig. 4 is a detail view of the adjustable foot-rest.

In the drawings, the shafts H, the wheels B, and the seat C may be of any ordinary form. The shafts are preferably formed with a compound curve at their rear ends, so as to give more space for access to the vehicle and in getting out therefrom. A leaf-spring F is secured to the under side of the shafts forward of their rear ends, and this at its middle portion is clipped to the axle. The rear end of this spring extends beyond the rear ends of the shafts and has an eye, to which is connected the second member of the spring G, which extends forward and is secured to the upper side of the rear end of the shafts, being held thereto by a bolt *g* and a clip *g'* of special construction. The seat is sustained by the seat-arms D, extending forwardly, pivoted to the cross-brace O, and by a leaf-spring H', extending transversely of the shafts and connected to the under side of the seat-arms D, the ends of said transverse spring being connected to the same clip *g'* which holds the shaft-springs. This clip bears on the members G of the shaft-springs, and it has ears which receive the ends of the transverse spring, the coupling being completed by a bolt passing through the parts and through the rubber bushing K. It will be seen from this that the clip answers a twofold purpose, serving to connect both the springs to the shafts. The rubber bushing K, fitted in the eyes of the transverse spring H', gives the desired resilience or yielding to the ends of the springs, and it is found preferable to the ordinary loop or link connection, in that it prevents lateral oscillation, is noiseless, and easy in action. The transverse spring braces the shafts and renders the whole action easy and steady. The foot-rest is flexible in character—that is, it may be raised or lowered and adjusted out of the way when it is desired to adapt the cart for different-sized persons or to dispense with the foot-rest entirely in speeding the horse. It consists, particularly, of pivoted sections, the rear sections being adjustable toward the front and the rear, by which adjustment the intermediate section or sections are raised and lowered. The front section is pivoted to the cross-bar O, curves downwardly, and is pivotally secured to the rear section at N. The upper end of this section has a pin on each side which fits in notches of the rack-bars J, secured beneath the seat, so that by adjusting this end of the section to or from the front the foot-rest is correspondingly lowered or raised for different persons. It will be understood that a greater number of sections may be employed.

It will be obvious that the features of my invention may be embodied in a cart used for two horses instead of that shown.

I claim as my invention—

1. In combination, in a road-cart, with the shafts and seat, the adjustable foot-rest composed of inflexible sections hinged together, the rear ends of said foot-rest being movably supported to be adjusted forward or backward to lower or raise the foot-rest, substantially as described.

2. In combination, in a road-cart, with the shafts and seat, the flexible foot-rest, the front end of the said rest being pivotally supported and the rear end being adjustable, and the rack-bars J for supporting the rear ends, substantially as described.

In testimony whereof I affix my signature in presence of two witnesses.

JAMES DONOVAN.

Witnesses:
 H. V. D. HOYT,
 WILLIAM KNIFFIN.